United States Patent

Sellers

[15] 3,707,147
[45] Dec. 26, 1972

[54] MEANS AND METHOD FOR PICTORIAL PRESENTATION OF PHYSIOLOGICAL SIGNALS WHICH VARY WITH TIME AND POSITION

[72] Inventor: Ernest E. Sellers, 2105 Copley Avenue, Ann Arbor, Mich. 48108

[22] Filed: Aug. 13, 1970

[21] Appl. No.: 63,394

Related U.S. Application Data

[63] Continuation-in-part of Ser. No. 634,960, May 1, 1967, abandoned.

[52] U.S. Cl. ..........................128/2.06 G, 128/2.1 B
[51] Int. Cl. ................................................A61b 5/04
[58] Field of Search..........128/2 A, 2 R, 2 V, 2.05 Q, 128/2.05 R, 2.06 G, 2.06 R, 2.06 V, 2.06 B, 2.1 B, 2.1 R

[56] References Cited

UNITED STATES PATENTS

| | | | |
|---|---|---|---|
| 3,159,023 | 12/1964 | Steinbrecher | 128/2 V |
| 3,480,002 | 11/1969 | Flaherty et al. | 128/2 V |
| 3,516,400 | 6/1970 | Krohn et al. | 128/2.06 R |
| 2,098,695 | 11/1937 | Southwick | 128/2.06 B |
| 2,457,744 | 12/1948 | Sturm | 128/2.06 B |

*Primary Examiner*—William E. Kamm
*Attorney*—McGlynn, Reising, Milton & Ethington

[57] ABSTRACT

A method and apparatus are disclosed for recording and displaying in a single picture the value of a signal, such as an electrocardial voltage, which varies as a function of time and position on a body. The display may be formed on an oscilloscope and is like a television picture in that an entire area is filled with information and each point in the area and the overall pattern are meaningful. The display shows signal value as a function of time along one axis and shows signal value as a function of position along another axis. The beam of the cathode ray tube is deflected through multiple sweeps along one axis while deflecting it through a single sweep along the other axis with traces which effectively fill the area bounded by the axes. The deflection along the respective axes are correlated with time and position on the body and the beam is continuously modulated in accordance with the amplitude of the signal. Preferably, the beam is deflected with multiple traces along the position axis and the signal is measured at discrete positions. The value of the signal at intermediate positions is derived by interpolation and the modulation is preferably accomplished by intensity modulation of the beam to achieve various shades of grayness.

17 Claims, 6 Drawing Figures

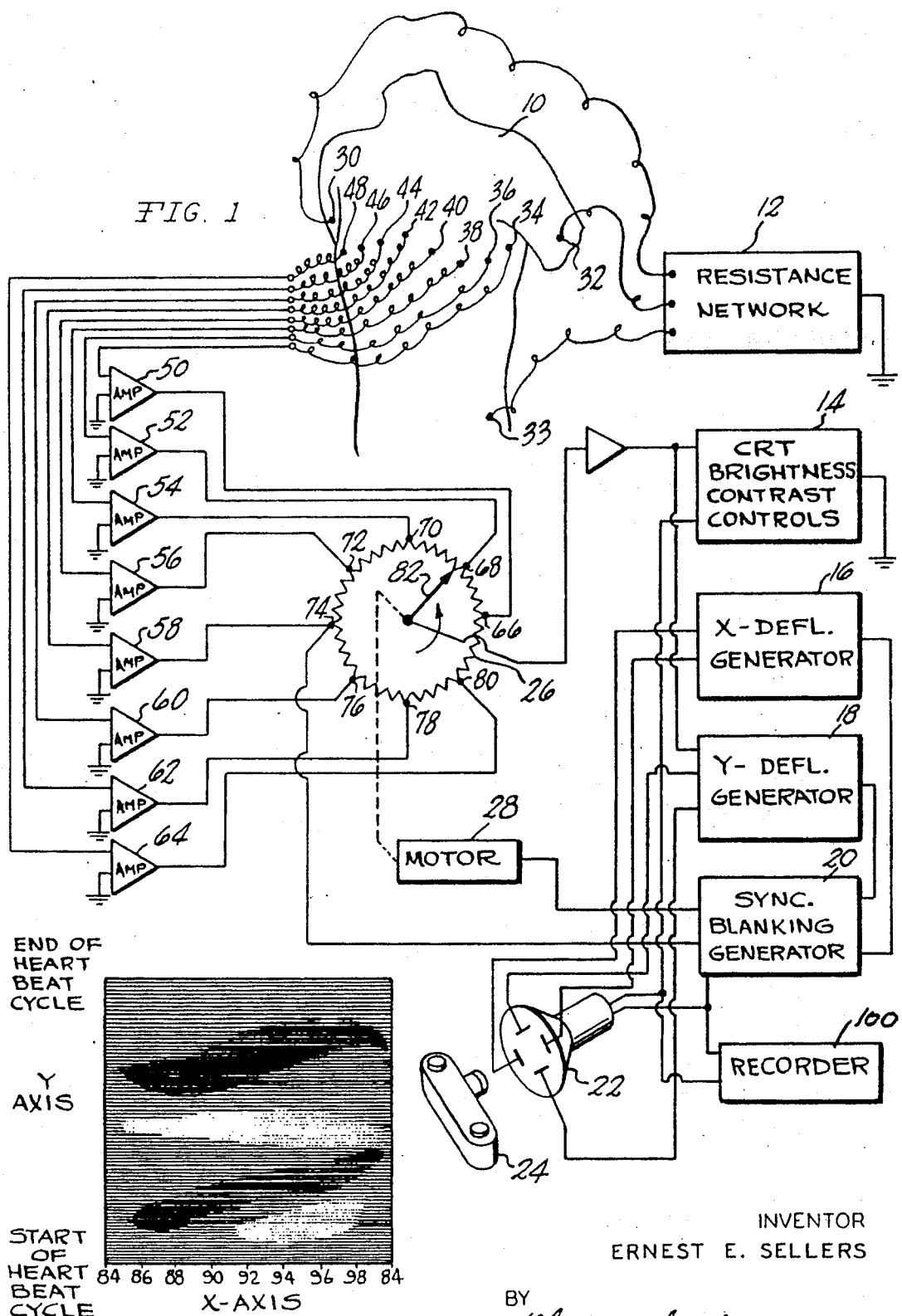

INVENTOR
ERNEST E. SELLERS

BY
Olsen and Stephenson
ATTORNEYS

MEANS AND METHOD FOR PICTORIAL PRESENTATION OF PHYSIOLOGICAL SIGNALS WHICH VARY WITH TIME AND POSITION

This invention relates to recording and, more particularly, to a method and apparatus for making a pictorial display of a variable quantity. This application is a continuation-in-part of my copending application Ser. No. 634,960 filed May 1, 1967, now abandoned for "Pictorial Presentation of Varying Medical Signals" the entire disclosure of which is incorporated herein by reference.

This invention has been developed primarily for the purpose of medical applications such as in electrocardiography however, the invention is also useful in many other applications. In general, the invention is useful for making a record and display for analysis and storage of the value of a variable quantity which varies with both time and position. The invention uses a form of display which facilitates interpretation of recorded data by pattern recognition by the human diagnostician or analyst. This is especially significant in the interpretation of recorded medical data, such as electrocardiograms.

Although many techniques for making electrocardiograms (EKG) and similar recordings of medical signals have been developed over a relatively long period of time, a single technique using a strip chart recorder has predominated.

It is well known that with each heartbeat the heart muscles flex and associated with this flexure and with the nerves controlling same there appears on the skin small voltages in the order of a millivolt in amplitude. The amplitude and timing of these voltages vary at different spots on the patient. These voltages are usually repeated with each heartbeat. A recording is taken over several seconds at each of these locations and then a doctor or skilled technician analyzes the amplitude variations with time and position of the recordings to help diagnose heart conditions. By analyzing the various recordings and other data, the specialist can often deduce whether the patient has a normal heart or has any of a variety of heart abnormalities. Specialists also use electroencephalographic (EEG) voltages obtained from certain fixed locations on the skull to determine and analyze brain conditions in somewhat the same way as the EKG is used to analyze heart conditions. The EEG voltages are somewhat different in nature than the EKG voltages in that the former voltage patterns may vary considerably, whereas the EKG voltages tend to be cyclic and repeat in time. These EEG voltages are associated with brain waves. In turn, these waves are associated with the body's sensors such as the eyes, etc., with the control of muscles, or with any of a variety of brain processes. Here again the doctor may compare the time-amplitude-space measurements taken on a patient with a suspected abnormality with readings that have been taken from normal patients to help deduce if the suspected abnormality is present. This must be done so as to determine if there are certain time-varying and space-varying patterns.

Although the strip chart form of recording for medical signals has become the most common technique, there are several disadvantages associated with its use and implementation. Such a strip chart is commonly one or two yards long and is a single-line graph of voltage versus time for each of several different successive positions on the patient's body. In order to save the time of the physician who must interpret the data recorded on the strip chart, it is the usual practice to have a semi-skilled person cut the strip chart into sections and mount the sections in a suitable side-by-side arrangement so that time variations at a given position and positional variations for a given time may be more readily visualized by the physician in making a diagnosis. Even in such an arrangement, however, the analysis of the data requires essentially a point-to-point type of comparison of separated single-line graphical recordings. This requires considerable time and a very high degree of skill to analyze and interpret the recorded data and requires a great deal of time for the preparation of the recording and display.

Another technique which has been proposed for recording and display of electrocardial signals uses a cathode ray tube and forms a single-line graph on the face thereof for each different electrode. In this technique plural lines are formed by using a slow horizontal time base and a relatively fast vertical time base with brightening pulses produced during each fast sweep at a time determined by the value of the voltage to be displayed. Thus, a line is plotted by a series of uniformly bright dots for each electrode, each of the dots having a vertical position related to the voltage magnitude and being spaced along the horizontal axis by the slow time base. One of the disadvantages of this technique is that the resultant display is constituted of discrete single-line graphs for each different electrode as in the conventional electrocardiogram. The recording technique produces the line graph by a series of uniformly bright dots and each line is interrupted along the time axis and the separate line graphs are widely spaced and lack continuity along the position-axis. It has also been proposed in the prior art to utilize a cathode ray tube for display of the relative values of signals derived from adjacent positions on a patient's body. In the recording technique, plural side-by-side electrodes are scanned synchronously with the horizontal sweep of the beam in the cathode ray tube and the beam is intensity modulated in accordance with the amplitude of the signals from the different electrodes. Thus, the relative values are indicated by the brightness of the horizontal trace on the face of the cathode ray tube. While this technique displays the variation of signal amplitude with position, it does not display the variation of signal amplitude as a function of time and there is no correlation of amplitude-time and amplitude-position variations.

In accordance with the present invention a variable quantity, such as a heartbeat signal, is recorded and displayed in a single picture which shows signal amplitude variation with both time and position. The picture may be formed and recorded temporarily on the face of a signal-to-light transducer, such as a cathode ray tube, or it may be permanently recorded as by means of photographic film. In any case, the data necessary for analysis, such as diagnosing the patient's condition, is recorded and displayed in a single, two-dimensional picture of a pattern which is characteristic of the condition being diagnosed. For example, a picture formed according to this invention using data the same as that taken for a conventional electrocardiogram will have a characteristic pattern corresponding to the condition of the heart. Thus, pattern recognition is facilitated and the diagnosis may be completed in short time; in effect, the pattern of the pictorial display of data taken on a given patient is compared with the pattern of a reference picture or display of data taken, for example, on a so-called "normal" heart. Such a pictorial display is made in accordance with this invention by using, for example, a cathode ray tube and deflecting the beam through multiple sweeps along one axis while deflecting it through a single sweep along the other axis with traces which effectively fill or cover the area bounded by the axes. The deflection along one axis is correlated with time and the deflection along the other axis is correlated with position on the body. The beam is continuously modulated in accordance with the amplitude of the signal and thus every point in the area represents the value of the signal at a given time and position. Preferably the beam is deflected with multiple traces along the position axis and the signal is measured at discrete positions and the value thereof at intermediate positions is derived by interpolation. Alternatively multiple traces are produced along the time axis. Although the invention is preferably implemented with a cathode ray tube as a recording means, other forms of signal to light transducers may be used. The modulation of the recording is preferably accomplished by intensity modulation to achieve various shades of grayness or the like; however, other forms of modulation such as color, flicker rate or minor deflection may be used.

In a particular embodiment, the display device which is the subject of the present invention seeks to pictorially display signals to produce a space-time-amplitude pattern of the electrical readings taken at various points over a time period. The present invention uses a cathode ray tube to paint the pattern with the positions of the electrodes plotted along the one axis and the heartbeat or brain wave time plotted along the other axis with the amplitude of the signals used to intensify the brightness of the trace. In this way a complete (that is, at all space positions) pictorial presentation of the heart or brain wave signals is produced over the time interval of the signals. A camera may be used to photograph the picture tube over a time period for permanent record purposes. Alternatively, a permanent record may be made by recording the signals controlling the cathode ray tube. The camera technique has the advantage that the patterns may be studied later and used as a permanent record for comparison with other patterns of the heart or brain condition taken from the same patient or from other patients. The same is true when the signals are electrically recorded and played back on a cathode ray tube.

It is a principle object of this invention to provide a display of the variations of a signal with both time and position in a single picture wherein time and position are represented along respective axes and signal value or amplitude is represented by a continuous modulation of a quality of the recording medium over the area within the bounds of the axes. A related object is to record such data as is necessary for analysis or diagnosis directly in such pictorial form thereby providing a record which requires small storage space and which is in readable form. An ancillary object is to provide a pictorial display of medical signals and the like which facilitate the recognition of patterns of signal amplitude in time and space which patterns are characteristic or indicative of certain conditions of the body from which the signals are derived.

It is also an object of this invention to provide pictorial presentations of the space-time-amplitude patterns associated with a medical condition in the body which presentations may be easily read.

It is another object of the present invention to provide a rapid means of recording and displaying a medical "signature-pattern" in the body in a dynamic or time-varying fashion where both the time variation and the space (electrode location) variation can be seen.

It is a further object of the present invention to provide a means of obtaining an easily reproduced permanent record of the condition of the body.

It is a further object of the present invention to provide a means for displaying the signals from other medical electrodes or sensors while still keeping the information from these extra sources in a form which may be readily absorbed by the user of the display and thereby letting him absorb more information with ease.

It is a further object of the present invention to provide a means for the quantitative measurement of the amplitudes and timings and other properties of the medical signals from a living body.

It is a further object of the present invention to provide a means for the recording of the space-time-amplitude patterns in the signals from an array of medical electrodes or sensors in a manner so as to permit their subsequent playback in "stop-action" fashion like that currently employed in commercial television broadcasting practice.

It is a further object of the present invention to provide a means for the simultaneous presentation of the signals from a variety of sources so that these signals may be compared and correlated in the presentation and additional information thereby made available to the user of the means.

It is a further object of the present invention to provide a means for making a pictorial presentation of time varying signals obtained from a series of fixed locations on a signal emitting body.

A more complete understanding of the invention may be obtained from the description that follows taken with the accompanying drawings in which:

FIG. 1 shows one embodiment of the present invention using a cathode ray tube for the presentation of the position-time-signal pattern of the electrical signals produced by a human heartbeat;

FIG. 2 is a picture that one might expect to get from a normal heart utilizing the apparatus shown in FIG. 1;

Figure 3:
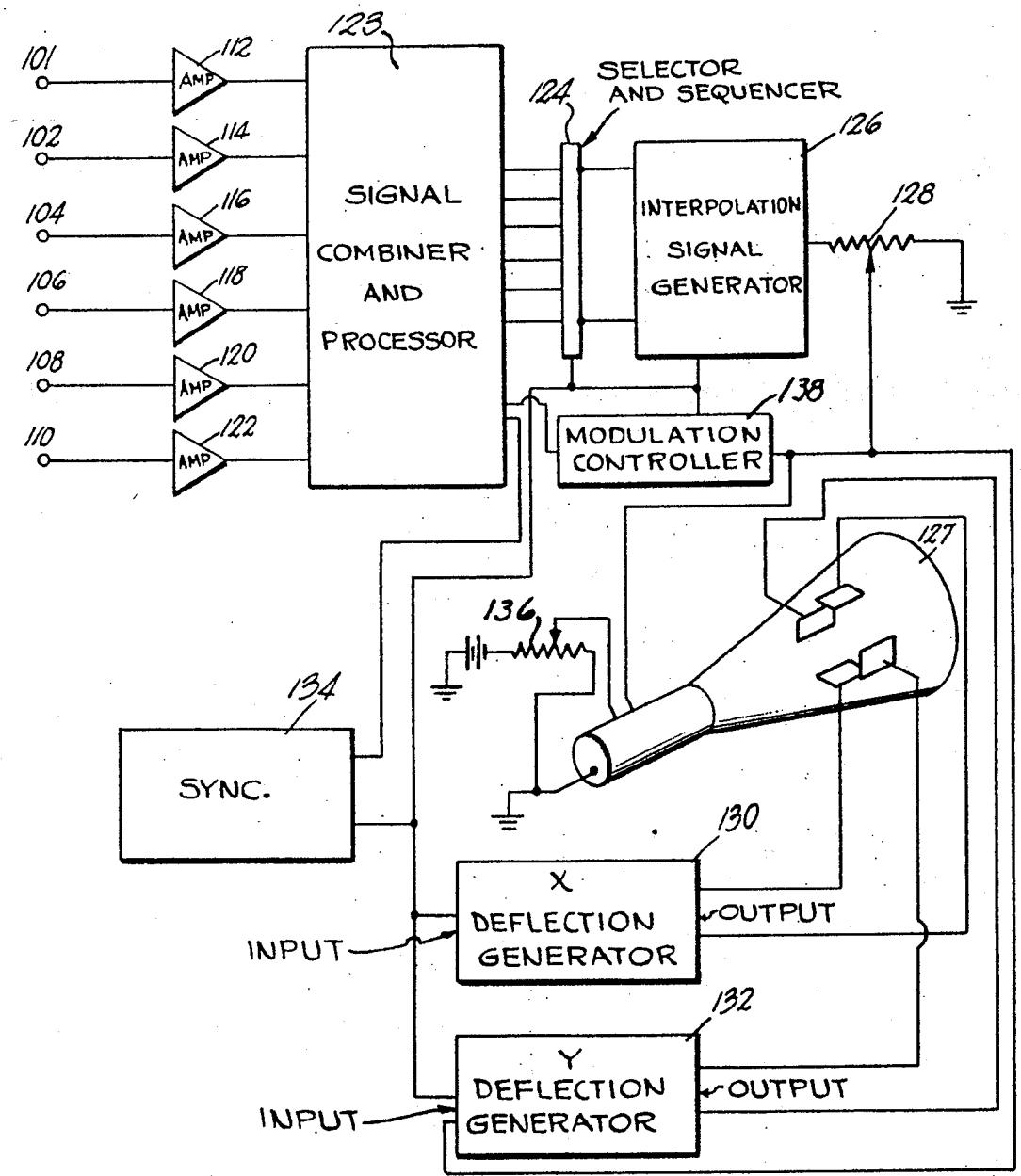
FIG. 3 represents an embodiment of the present invention using a cathode ray tube in which the signal intensity is plotted on the vertical axis of the tube and providing means to process, filter, or combine the signals mathematically and use them to control the color or flicker rate of the presentation.

Referring now to the drawings, the invention will be described with reference to several illustrative embodiments thereof. For explanatory purposes the invention is described as applied to medical purposes and more specifically for the recording and display of the heartbeat signals of a human body, as are used in making an electrocardiogram. It will be appreciated, however, as the description proceeds that the invention may also be applied to the recording and display of other types of signals.

FIG. 1 represents an arrangement of apparatus in accordance with the present invention for taking the electrical signals and presenting them pictorially to give a pattern of an operating human heart. In this FIGURE, 10 represents the torso of the human body with 12 being the resistance network that is used to get the body average potential or ground datum signal level from which the magnitude of the signals are measured. To do this the electrodes 30, 32 and 33 are attached to widely separated points on the body, usually to the two arms and to the left leg and the signals from electrode 30, 32, and 33 are combined in network 12. This same method of getting average body electrical potential is used in the electrocardiogram measurements presently in use but other arrangements may be used. The main parts of the apparatus in addition to the resistance network 12 are an oscilloscope including tube brightness and contrast control 14, the X axis deflection generator 16, the Y axis deflection generator 18, and the synchronization and blanking pulse generator 20. These are all used to control the cathode ray tube 22. When it is desired to obtain a permanent record of the heart condition, a picture of the cathode ray tube presentation may be taken with a camera 24 or the electrical signals controlling 22 may be recorded by recorder 100. A motor 28 is used to drive the rheostat 26 in synchronism with the horizontal sweep generator 16 and the synchronization blanking generator 20. One complete cycle of arm 82 is made during one horizontal sweep.

When the present invention is used to pick up electrical signals from the skin surface of the patient, 30, 32, 33, 34, 36, 38, 40, 42, 44, 46 and 48 are electrodes with skin surface contacts. If mechanical movement of a surface through a cycle is desired to be analyzed these electrodes may be replaced by transducers. Alternatively, if other quantities are to be sensed and displayed, these electrodes are replaced by sensors measuring these other quantities and yielding such measurements in electrical form. The electrical signals from electrodes 34 through 48 are amplified by amplifiers 50 through 64 respectively so that amplified signals proportional to the voltages picked up at electrodes 34 through 48 are presented at points 66 through 80 respectively on the rheostat 26. It may therefore be seen that when the pointer 82 is over the point 68 on the rheostat 26 a deflection voltage is impressed upon the X or horizontal axis of tube 22 proportional to the distance the pointer 82 has moved from the 0 position on the rheostat 26 (point 66) and the amount of illumination on the screen is proportional to the voltage which is generated at the electrode 36. As pointer 82 sweeps from 66 to 68 and around the rheostat back to 66 again the electron beam will proceed from left to right on the screen as shown in the FIG. 2 and the brightness of the dot as it moves across will be in direct proportion to the voltage at the electrode connected to the contact that is being scanned by the rotating contact 82. When the pointer is intermediate between any two adjacent amplifier-connected points on the rheostat, a linear interpolation between the voltage levels at the two amplifier-connected points is made. Therefore, during one scanning sweep, the voltages of all the electrodes are read and presented on the screen in the form of a line with the brightness varying with the voltage being generated at the various electrodes. Interpolations between these voltages are also displayed. When the contact 82 passes the point 66 on the rheostat 26 the blanking pulse generated by 20 blanks out the cathode ray electron beam and the beam is snapped back to the left side of the tube. Therefore, the intensity of the beam at the extreme right and at the extreme left should be almost identical. This horizontal sweep is a very high frequency so that several hundred sweeps will be made during a heartbeat cycle. The Y or vertical axis sweep generator 18 is triggered by the heart signal (electrode 42 as illustrated in FIG. 1) through synchronizing and blanking generator 20 at the beginning of the heartbeat to start the vertical sweep. It is so timed that it makes one vertical sweep during a heartbeat cycle and then snaps back to the bottom of the Y axis. Alternatively, one vertical sweep may correspond to more than one heartbeat cycle. During the heartbeat cycle of vertical sweep generation, the motor 28 has turned the contact 82 several hundred times around the rheostat so that maybe several hundred sequential readings of all the electrodes 34 through 48 have been made, and interpolations therebetween have also been made.

FIG. 2 is the heatbeat signature-pattern of a normal heart taken on the present equipment. The brightness of the line at 84 corresponds to the potential at 34, the brightness at the line 86 corresponds to the potential at the electrode 36, 88 corresponding to electrode 38, 90 to 40, 92 to 42, 94 to 44, 96 to 46 and 98 to electrode 48. It will be noted that 84 appears at both sides of the sweep so that the potential is the same on both sides as this corresponds to the instant that the sweep is snapped back to the starting position. If one examined any line from left to right, the intensity of the beam would be an indication of the electrical potential as the points are sequentially scanned and interpolated between at a high rate of speed. If one went vertically from the bottom to the top of the presentation over say the line 86 then they would have the variation of potential over a heartbeat cycle at the electrode 36 (which generates the voltage amplified by 52 and impressed on the rheostat 26 at point 68). If the lightness and darkness of the pattern along line 86 was plotted, with the more intense the pattern the higher the voltage, one would get substantially an electrocardiogram-type of time versus potential presentation for the electrode 36. By presenting amplitude as a function of position and as a function of time in one picture, i.e., a two dimensional display of three variables, the information may be easily read by semi-skilled people when they have gained experience using this type of chart. In other words, they get a television-type presentation of the heartbeat electrocardial voltages. The display is like a television picture in that an entire area is filled with information and each point in the area and the overall pattern are meaningful; the display differs, however, in that each picture shows signal value as a function of time and position whereas in television each picture shows signal value as a function of position and successive pictures are required to show variations with time. Recorder 100 can be used to record the signals controlling the cathode ray tube 22 for playback and repeat viewing on a cathode ray tube of the space-time-amplitude presentation.

When this apparatus is used to obtain the operating signature of an organ having a non-repetitive cycle, for example, the analyzation of brain waves, it is quite desirable to use a camera with moving film. Film motion in the time direction can replace the main vertical deflection. For example if it is desired to record the various electrode signals for several minutes, the persistence of the tube may not be sufficient to give a good viewing image, but the apparatus could be placed in a darkened enclosure with the camera shutter open during the entire time and a picture obtained that would be suitable for study and analyzation.

It is many times desirable in analyzing the operating characteristics of an organ to process the electrical signals after amplification to display combinations of various mathematical operations such as their sums, their differences, their products, etc. It is also many times desirable to plot the magnitude of the signal by a cathode ray tube pattern which is more accurately readable than the spot intensity on the tube. In these cases it may be desirable to superimpose the amplitude of the signal in a vertical direction on the signal as it sweeps across the horizontal axis. In this case the brightness of the screen illumination could be constant with the minor vertical deflection from the sweep trace being directly proportional to the amplitude of the signal being generated by the electrode. Alternatively, color coding of the amplitude of the displayed signal can be used. The apparatus shown in FIG. 3 provides a means for combining signals mathematically and the presentation of the amplitudes of the resultant signals in any sequence by vertical deflection of the horizontal beam. It also shows means for other types of modulation control (138).

Referring to FIG. 3 and this embodiment, six electrodes or sensors 101, 102, 104, 106, 108 and 110 are shown which may be attached along a regular position pattern such as along a line on the patient's body. The signals from these electrodes 101 through 110 are then fed through amplifiers 112, 114, 116, 118, 120 and 122, respectively. After amplification these signals are then fed into a signal combiner and processor 123, where some mathematical operation or combination variety of mathematical operations as their sums, differences, products, quotients, derivatives, integrals, cross correlations or auto correlations, etc., are performed. If desired, the signals may each be passed through frequency filters and/or non-linear elements to emphasize or de-emphasize certain frequencies and/or certain voltage levels. The multiplicity of output signals then goes to a selector and sequencer 124. The selector-sequencer 124 may select pairs of signals which correspond to adjacent positions on the patient's body. The circuit 124 then sequences the different pairs selected starting with some function of the signals from perhaps 101 and 102 and then sequence to the next pair which may be a function of the signals received from 102 and 104 and a third sequence being the selection of a pair 104 and 106. The sequence then proceeds in like manner until pair 108 and 110 are reached. The sequence then starts over again with the signals from 101 and 102 and repeats the cycle. The pair of selected signals is interpolated between in a smooth time-varying fashion by interpolation signal generator 126. The output of interpolation signal generator 126 is fed to adjustable rheostat 128 whose pick-off pointer voltage controls the intensity of the beam of cathode ray tube 127. In an alternative arrangement, the pick-off pointer voltage of rheostat 128 would control the color of cathode ray tube 127 with circuitry obvious to those skilled in the electronic art. In another alternative arrangement, the signal from rheostat 128 controls the color or the intensity of the beam of cathode ray tube 127 while simultaneously some other signal from the signal combiner and processor 123 or the interpolation signal generator 126 controls the minor vertical deflection of cathode ray tube 127. In other words, there can be a simultaneous multiplicity of outputs from 123 or 126 from the variety of mathematical operations performed in 123 or interpolated between in 126 and this multiplicity can be connected in any combination to the various types of modulation control of tube 127. This can be done as shown in modulation controller 138 which has inputs from 123 and 126 and controls the nature of the modulation of 127. The types of modulation which are possible including intensity modulation, color modulation, and flicker rate modulation. Any one or any combination of these types can be simultaneously used, and one input to 138 can control one type while another input to 138 controls another type of modulation simultaneously. The selector and sequencer 124 is controlled by the synchronizer 134 which controls the X deflection generator, the interpolation signal generator 126, and partially controls the Y deflection generator 132. The other portion of the control of Y deflection generator is by the signal from the interpolation signal generator 126 through rheostat 128. This helps produce a deflection modulated presentation signal on the cathode ray tube 127 with the intensity of the beam remaining constant as set by the intensity control 136. The signal from the interpolation generator 126 is fed to the Y deflection generator 132 through rheostat 128 to produce a minor vertical deflection on the horizontal sweep line which is a function of the voltage output of 126. The Y deflection generator also produces a time voltage variation that controls a vertical sweep at much slower repetition rate than the horizontal sweep. The X deflection generator 130 produces an X axis sweep signal that indicates the position of the electrode or electrodes that are producing the signal. The horizontal or X sweep may be from 64 to 1000 times the vertical or Y sweep speed. The result can be a presentation such as is shown in monochrome in FIG. 4.

Figure 4:
FIG. 4 shows a monochrome presentation one may get from the embodiment shown in FIG. 3.

In FIG. 4 this presentation is a display having a ratio of about 64 horizontal sweeps to one vertical sweep. The position of the electrode or electrodes producing the signal is plotted along the X axis with time and signal amplitude plotted along the Y or vertical axis. The minor deflections in the vertical direction are proportional to the signals received during any sweep. It will be noted that the difference between the TV display shown in FIG. 2 and the deflection modulated or DM display shown in FIG. 4 is that the TV display has light and dark portions of the horizontal sweep where the DM display has vertical deflections of the horizontal sweep to indicate the magnitude of the voltages picked up. The DM display has the advantage of being more easily read quantitatively whereas the TV display may be more easily read qualitatively since the overlapping of the raster lines in some types of presentations may tend to confuse the picture. If the alternative, using color is used, this also is useful for quantitative determinations since the eye-brain combination can be quite sensitive to color changes. Obviously too, any combination of intensity, color, flicker rate or deflection modulation can be used. As in the embodiment shown in FIG. 1, a camera such as shown at 24 in FIG. 1, can be used with the embodiment shown in FIG. 3 to provide a permanent record. Alternatively, an electrical signal recorder, such as shown at 100 in FIG. 1, can be used to record the signals controlling cathode ray tube 127 for subsequent playback to the cathode ray tube. When camera 24 is a moving film camera and the time-direction deflection is modified as described in the previous description of FIG. 1, the recording may be made over any chosen time interval. It is obvious that the sensed voltages can also come from pairs of electrodes or sensors on the patient's body with one set of these being scanned and interpolated between as described previously and the other set of this pair being simultaneously scanned and interpolated between in a similar fashion. This is more or less equivalent to replacing resistance network 12 in FIG. 1 with a scanning and interpolating arrangement like that previously described and replacing the inputs to 12 from 30, 32, and 33 with a set of electrodes or sensors on the patient's body similar to sources 34, 36, 38, 40, 42, 44, 46, and 48 which are the sources scanned and interpolated between with the arrangement replacing network 12. In this way voltage differences between pairs of sources are scanned, interpolated between and presented pictorially.

Figure 5:
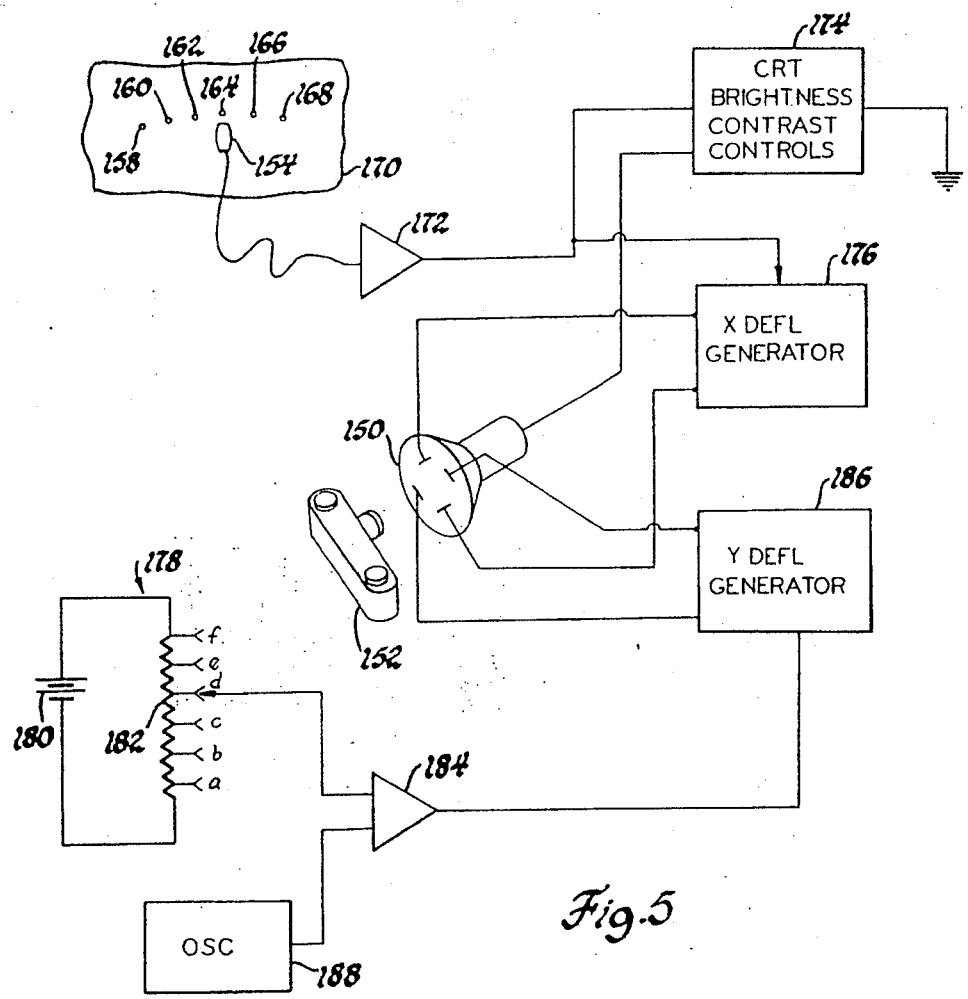
FIG. 5 shows another embodiment of the present invention using a cathode ray tube for the presentation of the signal pattern.

Referring now to FIG. 5, there is shown another embodiment of the invention in apparatus adapted to produce a record and display in picture form. In this embodiment a continuous line is recorded along the time axis for each different position of the signal source. As described with reference to the other embodiments the display is formed on the screen of an oscilloscope having a cathode ray tube 150 and the display may be recorded permanently on a photographic film by a camera 152. This embodiment is illustrated in simplified form requiring a minimum of components for making the display of the desired data. A single sensor or electrode 154 is manually movable from position to position by an operator during the recording process. It is noted that the electrode 154 is movable to selected positions 158, 160, 162, 164, 166 and 168 on the body 170. The electrode 154 is connected to the input of an amplifier 172, the output of which is applied to the brightness contrast control 174 of the oscilloscope and the output of the control 174 is applied to the intensity modulation grid of the cathode ray tube 150. The output of the amplifier 172 is also applied to the synchronizing input of the X deflection generator 176 in order to initiate the horizontal sweep input to the X deflection electrodes upon contact of the electrode 154 with a selected position on the body 170. The X deflection generator produces a horizontal sweep which has a time scale sufficient to cover at least one full heartbeat or cycle of the signal voltage and preferably the time scale is adjusted to cover two or three cycles. A deflection voltage source 178 is provided in order to position the beam of the cathode ray tube 150 along the Y-axis in accordance with the position of the electrode 154 on the body 170. This source suitably takes the form of an adjustable DC voltage source which may comprise a battery 180 and a potentiometer 182 having plural contacts $a, b, c, d, e$ and $f$ corresponding respectively to the positions 158 through 168 on the body 170. The output voltage of the potentiometer 182 is applied to one input of a summing amplifier 184, the output of which is applied to the input of the Y deflection generator 186. Thus, as the electrode 154 is moved from one position to another through the sequence of positions 158 through 168, the movable contact of the potentiometer 182 is moved from one contact to another through the sequence $a$ through $f$, respectively. Consequently, the deflection voltage is increased with each successive change of position and the beam of the cathode ray tube is deflected an additional increment along the Y or vertical axis for each successive position. In order to effectively broaden the continuous trace of the cathode ray tube during each successive sweep thereof an oscillator 188 of a suitably high frequency, such as 20 kilohertz or higher, is connected to another input of the summing amplifier 184. Thus, the DC or steady state deflection voltage from the source 178 and the oscillatory voltage from the oscillator 188 are additively combined in the amplifier 184 and applied to the input of the Y-deflection generator 186. The amplitude of the oscillatory voltage 188 is adjusted to provide the desired line width and is preferably adjusted to a peak to peak amplitude which is approximately equal to the difference in magnitude of the DC voltage between adjacent taps on the potentiometer 182. In this manner the adjacent lines or traces along the time axis are made contiguous with each other and the picture is completely filled in to represent the variation of amplitude with both time and position.

Figure 6:
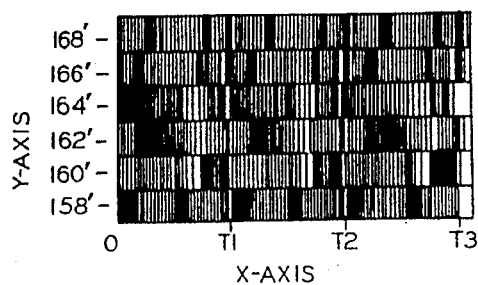
FIG. 6 is a picture which may be obtained using the apparatus of FIG. 5.

In operation of the apparatus of FIG. 5 a record and display is produced as shown by the picture of FIG. 6. The time scale is adjusted along the X axis to display the data for each position over three successive heartbeats. The deflection voltage source 178 is initially set with the potentiometer at contact $a$ and to initiate the recording, the electrode 154 is placed in contact with the position 158 on the body 170. The occurrence of a heartbeat at time 0 produces a signal voltage at the point 158 which is applied through the amplifier 172 to the synchronizing input of the X deflection generator 176 which starts the time sweep of the beam along the X axis with successive heartbeats at time T1 and time T2. With the movable contact of the potentiometer 182 in engagement with the fixed contact $a$, the beam has a steady state or average position along the Y axis corresponding to the position 158. With the oscillator 188 running the high frequency voltage thereof is applied through the amplifier 184 to the Y deflection generator 186 and, accordingly, the beam is caused to oscillate in the vertical direction so that the continuous line trace appears in the form of a band extending parallel to the X axis. In FIG. 6 the recorded signal on line 158' corresponds to the signal from position 158. Note that the intensity variation of the continuous, wide band trace along the X axis corresponds to the amplitude variation as a function of time over three heartbeat cycles. After recording of the signal at position 158 the movable contact of the potentiometer 178 is moved to contact b and the electrode 154 is moved into contact with the body 170 at position 160. Again the occurrence of the heartbeat produces a signal voltage which is applied through the electrode 154 to the amplifier 172 and thence to the synchronizing input of the X deflection generator 176. The output of the amplifier is also applied to the brightness contrast control 174 and the recording is initiated. With the potentiometer at contact b the steady state deflection voltage is applied through the amplifier 184 to the Y deflection generator 186 and the steady state position of the beam is moved upwardly along the Y axis by one increment. With the oscillator 188 running the trace is effectively broadened in the vertical direction, as described previously. Accordingly, as shown in FIG. 6 the signal is recorded on line 160' as a continuous line trace contiguous with the recording trace of signal 158'. The intensity variation of the recorded signal 160' along the X axis represents the variation in amplitude of the signal as a function of time over the three heartbeats. In a similar manner the electrode 154 and the movable contact of the potentiometer 182 are advanced through the successive positions to record the signals on lines 162', 164', 166' and 168' from the positions 162, 164, 166, 168, respectively. The resulting record and display produced on the screen of the cathode ray tube 150 and permanently recorded on the film in camera 152 is a picture as shown in FIG. 6. Note that the signal at each position is recorded as a single continuous trace along the X axis and the intensity modulation thereof represents a signal amplitude variation as a function of time. Note also that at any given time the intensity modulation of the signal along the Y axis represents the signal amplitude variation as a function of position. Accordingly, in the single picture the signal amplitude variation is shown as a function of time and position and forms a pattern which is indicative or characteristic of certain conditions of the body thereby enabling analysis or diagnosis by pattern recognition.

Although the description of this invention has been given with reference to a particular embodiment thereof, it is not to be construed in a limiting sense. Many variations and modifications will now occur to those skilled in the art. For a definition of the invention reference is made to the appended claims.

The embodiments of the invention in which an exclusive property or privilege is claimed are defined as follows:

1. The method of making a two-dimensional display of the value of a variable quantity which is continuously varying with time and position on a body comprising the steps of establishing a first axis on a recording medium with displacement therealong from the origin corresponding to time, establishing a second axis on the recording medium with displacement therealong from the origin corresponding to position, moving a recording element through multiple sweeps along one of said axes of the recording medium while moving it through a single sweep along the other of said axes, producing during said multiple sweeps multiple traces of sufficient intensity to be continuously visible on the medium each of which is effectively contiguous with the adjacent trace, said traces thereby occupying substantially all of the area bounded by said axes on said recording medium, the motion of the recording element along one of said axes being a function of time and the motion along the other of said axes being a function of position on said body, and continuously modulating a recording characteristic of said recording element in accordance with the continuously varying value of the variable quantity whereby said area has a continuously modulated quality and every point therein represents a value of said quantity at a given time and position.

2. The invention as defined in claim 1 wherein the motion along the first axis is a function of position on said body and the motion along the second axis is a function of time and wherein said recording characteristic is light intensity.

3. The method of making a two-dimensional display representing the variation of the value of a continuously varying variable quantity which is variable with time and position on a body comprising the steps of: producing a continuously varying signal corresponding to the value of the variable quantity at different positions during equal time intervals, establishing a first axis on a recording medium with displacement therealong from the origin corresponding to time, establishing a second axis on the recording medium with displacement therealong from the origin corresponding to position, displacing a recording element along one of said axes of the recording medium as a function of time so that the maximum displacement corresponds to said time interval, displacing the recording element along the other of said axes in correspondence with the sequence of selection of positions on said body, generating a trace of multiple sweeps along one of said axes during a single sweep along the other of said axes, continuously recording the trace of said recording element during its forward scan along one of said axes and continuously modulating in a continuously variable manner a recording characteristic of said recording element in accordance with the continuously varying value of said signal, said trace being of sufficient intensity to be continuously visible on the medium with the multiple sweeps thereof being effectively contiguous with the adjacent sweep so that the trace occupies substantially all of the area bounded by said axes on said recording medium, whereby said area has a continuously modulated quality and the value of the variable quantity for any position is displayed as a substantially continuously variable function of time along one axis and the value of the variable quantity at a given time is displayed as a function of position along the other axis in a single picture.

4. The invention as defined in claim 3 wherein said recording characteristic of said recording element is the intensity of the trace thereof.

5. The invention as defined in claim 4 wherein said recording element is displaced through multiple sweeps along said first axis during the single sweep of said element along said second axis and wherein said step of continuously recording the trace of said recording element is performed during the forward scan along said first axis thereby producing multiple, continuous, side-by-side lines each of which represents the continuous variation in the value of the variable quantity with time for different positions on said body.

6. The invention as defined in claim 3 including the step of producing signals corresponding to interpolated values of the variable quantity at positions intermediate said different positions and wherein said step of modulating is performed in accordance with the value of said signals including those corresponding to the interpolated values of the variable quantity.

7. Apparatus for making a two-dimensional display representing the time variation of the value of a variable quantity at different positions on a body comprising: signal producing means for producing signals in time succession corresponding to the values of the variable quantity at different positions during equal time intervals, a signal to light transducer having an image forming means with light producing means adapted to produce a spot of light movable along first and second axes thereof and forming a persistent trace thereon, one of said axes being calibrated in terms of time and the other being calibrated in terms of position, first deflection means connected with the light producing means for displacing said spot of light along a first axis as a function of time so that the maximum displacement corresponds to said time intervals, second deflection means connected with the light producing means for displacing said spot of light along a second axis in correspondence with said different positions, one of said deflection means producing multiple parallel sweeps of the light spot along the respective axis during a single sweep of the light spot along the other axis, means in said transducer producing a continuous spot of light and trace which is continuously visible during its said multiple parallel sweeps in the forward direction thereof, and said signal producing means being connected with the signal to light transducer and continuously modulating a characteristic of said light spot in a continuously variable manner in accordance with the value of the variable quantity.

8. The invention as defined in claim 7 wherein said variable quantity is an electrical voltage at selected positions on a human body incident to the heartbeat of said body and wherein said equal time intervals correspond to one or more cycles of said heartbeat, and said signal producing means includes plural electrodes disposed at selected positions on said body and means for sequentially connecting said electrodes with said light producing means.

9. The invention as defined in claim 8 further including modulating means connected with said signal producing means and said light producing means, said modulating means being adapted to modulate the intensity of said spot of light in accordance with the value of the variable quantity.

10. The invention as defined in claim 8 and further including modulating means connected with said signal producing means and one of said deflection means and adapted to produce a minor deflection of said spot of light in accordance with the value of the variable quantity.

11. The invention as defined in claim 7 wherein said one of said deflection means is said first deflection means thereby producing multiple continuous traces corresponding to different positions on said body, each of said traces representing the variation in time of said variable quantity at a corresponding position.

12. The invention as defined in claim 11 and further including a constant frequency oscillator connected with said second deflection means, the frequency of said oscillator being high relative to the sweep frequency along said first axis thereby effectively widening said continuous traces.

13. The invention as defined in claim 7 wherein said one of said deflection means is said second deflection means thereby producing a multiplicity of continuous parallel traces, each of which represents the value of the variable quantity at a given time at the various positions.

14. The invention as defined in claim 13 and further including interpolation means connected with said signal producing means and said signal-to-light transducer and adapted to modulate said continuous trace in accordance with interpolated values of said variable quantity at positions intermediate said different positions.

15. The invention as defined in claim 7 and further including means for exposing a light sensitive film to the signal-to-light transducer during one full cycle of the signals produced in time succession.

16. The invention as defined in claim 7 and further including signal recording means connected with said signal producing means to record the signals electrically, whereby said signals may be played back and applied to said signal-to-light transducer for delayed viewing of said display.

17. The invention as defined in claim 8 wherein said signal-to-light transducer is a cathode ray tube.

* * * * *